July 31, 1956 M. G. BURWELL Re. 24,187

METHOD FOR PRODUCING AN AGGREGATE-LINED CORROSION-RESISTANT HOT WATER TANK

Original Filed March 17, 1951 2 Sheets-Sheet 1

INVENTOR

Maurel G. Burwell

BY W. S. McCloell

ATTORNEY

INVENTOR
Maurel G. Burwell

BY W. S. McClowell
ATTORNEY

United States Patent Office

Re. 24,187
Reissued July 31, 1956

24,187

METHOD FOR PRODUCING AN AGGREGATE-LINED CORROSION-RESISTANT HOT WATER TANK

Maurel G. Burwell, Columbus, Ohio, assignor to Century Tank Manufacturing Company, Columbus, Ohio, a corporation of Ohio Original No. 2,700,622, dated January 25, 1955, Serial No. 216,174, March 17, 1951. Application for reissue September 19, 1955, Serial No. 535,310

8 Claims. (Cl. 117—64)

Matter enclosed in heavy brackets [ ] appears in the original patent but forms no part of this reissue specification; matter printed in italics indicates the additions made by reissue.

The present invention relates to hot water tanks, range boilers, and the like, and more particularly to an improved aggregate-lined hot water tank and method for producing the same.

In the past, it has been proposed to line the interior surfaces of hot water tanks, range boilers, and the like with corrosion-resistant materials, such as glass, enamel, and cement, to protect the inner surfaces of the metallic tank from direct contact with water introduced therein, and thereby to prevent corrosion and rusting of such tank and the consequent undesirable contamination of the hot water source with rust deposits. However, hot water tanks having non-corrosive inner linings are subject to numerous objections, primary of which is the relatively high cost of such tanks, and also the relatively fragile nature of the inner lining material which is easily cracked or broken during shipment or handling of such tanks, or which may be destroyed when the outer surface of the tank is subjected to impact forces or sharp blows. Also, prior hot water tanks embodying a cement lining have been found to be entirely impractical due to the shrinkage of the concrete inner lining material after initial application thereof to the walls of the tank and during curing of the applied cementitious mix, with the result that the inner lining separates from the inner surfaces of the metallic tank structure and is subject to relative displacement within the tank, thus rendering the same easily broken or cracked and incapable of withstanding the normal pressures exerted by water introduced therein under municipal water main pressures.

The primary object of the present invention, therefore, is to provide a hot water tank having an inner lining of corrosion-resistant cementious aggregate material which is so applied as to cover completely the entire inner surface of the metallic tank and maintain its relative position in abutting relation to the side walls of the tank, thereby preventing relative displacement between the inner surfaces of the tank and the inner lining upon curing or hardening of the latter. A further object is to provide an aggregate lined tank wherein the inner lining possesses an inherent toughness sufficient to prevent cracking or breaking of the lining due to impact forces normally encountered during shipment and handling of the tank.

It is another object of the invention to provide an efficient and economical method for applying an inner aggregate lining to metallic tanks, whereby the manufacturing cost of such tanks is materially reduced in comparison with the usual glass or enamel lined tanks.

A further object of the invention is to provide an improved inner lining material for metallic tanks which may be efficiently and economically applied to the inner surfaces of metallic tanks, and wherein the curing of the inner lining material is effected substantially concurrently with the application of such material to the inner surfaces of the tank, thus eliminating shrinkage of the lining material with respect to the tank structure and enabling such tanks to be produced in substantially continuous high-speed operations.

A still further object of the invention is to provide a method for producing inner-lined metallic hot water tanks, wherein the components of the inner lining material or composition are introduced [and intimately admixed] within the unlined tank and thereafter forcibly applied and compacted against the inner surfaces of the tank by centrifugal forces established by relatively high-speed rotation *and simultaneous vibration* of the tank, whereby to deposit a uniform thickness or layer of corrosion-resistant material over the entire inner surface of the tank.

For a further and more detailed understanding of the present invention and the various additional objects and advantages realized therefrom, reference is to be had to the following description and the accompanying drawing, wherein.

Figure 1:
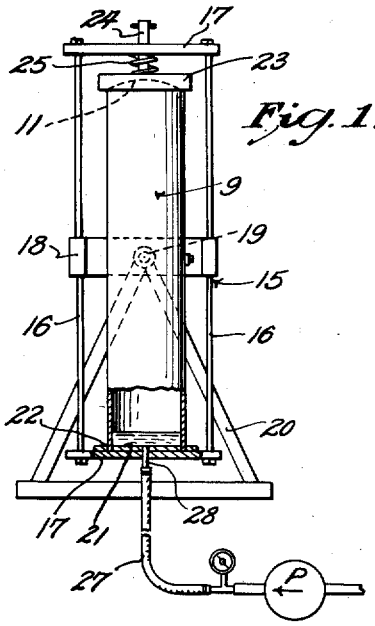
Fig. 1 is a diagrammatic view of a machine employed in the application of a resinous coating material to the inner surfaces of the tank body preparatory to applying the aggregate inner liner.
Figure 2:
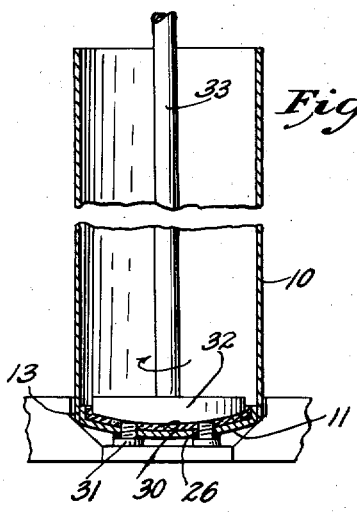
Fig. 2 is a diagrammatic vertical sectional view showing the application of the mineral aggregate to the head closure member of the tank.

In accordance with the present invention, I make use of a metallic hot water tank 9 comprising a cylindrical open-ended body 10 and top and bottom members 11 and 12, respectively. In the usual manner, the cylindrical body portion 10 may be formed from a single sheet which is rolled and bent into the cylindrical configuration as shown, and which has the abutting longitudinal edges thereof welded together to provide an elongated cylindrical shell. The end closures 11 and 12 terminate at their marginal edges in annular flanges 13 which are arranged to telescope within or over the ends of the cylindrical body portion 10 to close the same. It will be understood that the end closures 11 and 12 are rigidly connected with the cylindrical body portion 10 as by welding or other suitable means providing fluid-tight connection therewith.

In preparing a metallic tank for lining operations, the inner surfaces of the cylindrical body 10 and the end closures 11 and 12 are applied with a relatively thin coating or layer 14 of a hardenable resinous material, such as one of the phenolic base resins or one of the hardenable asphaltic base resins, in order to cover completely the inner surface of the metal. This application of the resinous material, as shown in Fig. 1, is preferably carried out under relatively high pressures to assure permanent adhesion between the resinous material and the inner surface of the tank and to eliminate the necessity of first cleaning or finishing the interior surface of the tank to secure a good bond between the resinous coating and the metal of the tank. It should here be understood that by applying a phenolic base resin, such as a liquid form of phenol-formaldehyde, to the inner surfaces of the tank under superatmospheric pressures, the liquid coating material is forcibly applied to the inner walls of the tank to displace adhering foreign matter or dirt disposed upon the inner surfaces of the tank and thereby to directly contact the metal of the tank itself. Thus, the resinous coating material functions to seal any cracks or crevices within the inner surface of the tank, and is prevented from later scaling or spalling due to the prior displacement of any dirt or foreign matter from the inner wall surfaces of the tank. The step of applying the resinous coating 14 to the inner surfaces of the tank is diagrammatically illustrated in Fig. 1 of the drawing, wherein the numeral 15 designates generally a tank-receiving frame including a plurality of relatively spaced parallel side members 16 which are united at their respective ends by transversely disposed end plates 17, and intermediately of their ends by an arcuate strap 18. The frame 14 is supported by a trunnion 19 connected with the strap 18 and rotatably carried within a stationary trunnion-supporting frame 20. Thus, the tank-receiving frame 15 is mounted on the stationary frame 20 for rocking movement in a substantially vertical plane. One of the end plates 17 of the frame 15 is provided with a flat inwardly extending sealing plate 21 in which is formed an annular groove, as at 22, to receive an open end of the cylindrical body 10 of the tank. The opposite end of the tank which may, or may not, have its associated end wall closure secured thereto is received within a cavity formed in a spring-pressed head 23. The head 23 is supported on a shaft 24 which slidably extends through an opening formed in the opposite end plate 17, and mounted between the head 23 and end plate 17 is a coil compression spring 25 which is arranged to resiliently urge the head 23 inwardly of the frame 15 and thereby to releasably support the tank 10 within the frame for tilting or rocking movement therewith. The spring-pressed head 23 additionally serves to tightly seal the opposite open end of the tank within the annular groove 22 of the sealing plate 21.

When it is desired to apply the coating 14 to the inner surfaces of the metal tank, a given quantity of the viscous liquid uncured resinous material, commensurate with the desired thickness of coating, is introduced within the interior of the tank by way of one of the pipe-receiving openings 26 provided in the body portion 10 for the reception of the usual inlet and outlet pipes or conduits associated with the ordinary side-arm heater tank, or one of the pipe-receiving openings provided in the underfired type of tank. After introduction of the liquid coating material within the tank, the various pipe-receiving openings are plugged to seal the interior of the tank against the escape of fluids. Thereafter, compressed air derived from a compressor or pump P is introduced within the tank by way of a flexible hose or conduit 27 which extends from the pump outlet to a conduit connection 28 extending through the end plate 17 and the sealing plate 21 and communicating with the open end of the tank 10. The pressure exerted within the interior of the tank ranges preferably between 50 and 80 p. s. i., and while this pressure is present within the tank, the same is rocked or tilted back and forth in conjunction with the frame 15 to evenly distribute the liquid coating material over the entire inner surface of the tank body and to provide thereon a relatively thin film of the uncured viscous liquid. It is important to note that the application of relatively high pressures to the interior walls of the tank, in addition to providing an efficient means for applying the coating material, also serves as a means for testing the tank structure to detect leaks. In the event that the tank body should have relatively small holes therein, the application of pressure within the tank immediately forces the liquid resinous material through such openings or leaks to make the position of said openings or cracks visible to the naked eye, and steps may be immediately taken to repair the defective tank by welding the same in the regions of the leaks or openings and thereby to seal the tank.

After tilting of the tank and inspection thereof for leaks, the pressure within the tank body is relieved and the same is placed in a curing oven to cure and set the resinous coating 14. The inner surfaces of the top and bottom closures 11 and 12 are similarly coated with the resinous material, preferably under pressure, and thereafter cured at elevated temperatures within the body 10 of the tank.

After application of the resinous coating material to the interior surfaces of the tank and end closure members, a cementitious aggregate mix is then applied to the top and bottom closures. In general practice, the tank body 10 has the upper or top closure 11 welded thereto prior to the application of the resinous coating material, but the bottom end closure 12 is removed prior to coating to provide access to the interior surfaces of the body 10 and top closure 11 with the tank body in an inverted position, and with the pipe-receiving openings 26 of the closure plugged by screw-threaded spuds 21 which project inwardly through the openings 26 and beyond the normal thickness of the cementitious layer 30. After the cementitious aggregate layer 30 is deposited upon the inner surface of the closure 11, the same is troweled to a uniform thickness by means of a rotary troweling head 32 which is formed so as to enter the open end of the tank and to move axially through the cylindrical body 10 and to fit within the side flange 13 of the end closure 11. A rotary shaft 33 supports the head 32 and imparts rotation thereto to compact and smooth the inner surface of the layer 30. The detached bottom end closure 12 is treated in a similar manner to apply thereto an inner lining of cementitious aggregate in the event that the associated tank comprises the usual side-arm heater type of tank, it being understood, however, that the bottom closure 12 of an underfired-type tank, which is normally formed from stainless steel, or which is lined with porcelain or the like, is not treated to apply a cementitious aggregate lining thereto, in view of the fact that the bottoms of such underfired tanks are originally formed from, or are provided with linings of, corrosion-resistant materials.

Following the steps of applying the aggregate inner lining to the top and bottom closures, where necessary, the lining material is permitted to set and solidify. Thereafter, the bottom end closure 12 is welded to the tank body 10 to close the interior thereof, with the exception of the normal pipe-receiving openings 26. Prior to or following the welding of the end closure 12 to the tank body, a quantity of sand may be introduced within the interior of the tank as a component part of an aggregate mix which, as will be hereinafter more fully explained, provides the entire inner lining material for the tank body 10.

Figure 3:
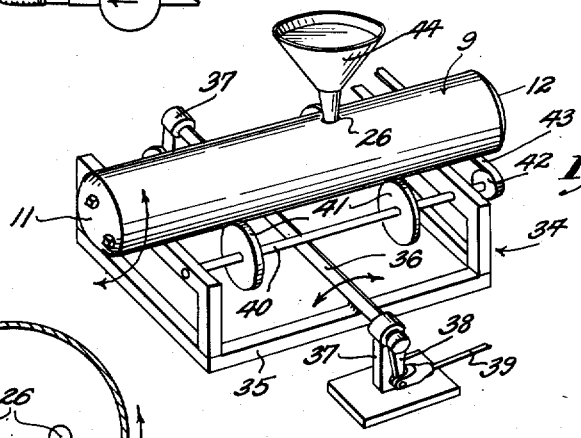
Fig. 3 is a perspective view of a tank-roating and tilting machine utilized in the step of mixing the aggregate lining material.

The tank, with its end closures 11 and 12 welded thereto, is then placed upon a mixing machine 34 which is illustrated in diagrammatic form in Fig. 3 of the drawing. The mixing machine 34 comprises a frame 35 which is rigidly carried on a trunnion shaft 36 having its respective end portions rotatably supported in stationary bearing frames 37. A crank arm 38 is connected with one end of the shaft 36 and serves to impart oscillating movement to the shaft in response to reciprocating movement of a connecting rod 39 which is connected to be reciprocated by a motor or engine and an associated motion-transmitting drive, not shown. Extending longitudinally of the frame 35, and journaled therein for axial rotation, are a pair of spaced parallel shafts 40, each of which carries, at spaced longitudinal intervals, a pair of cradle wheels or rolls 41 which provide a cradle bed for the tank body 10. Connected with one of the shafts 40 is a drive pulley or gear 42 which is arranged to be driven by a continuous belt or chain 43 which is drivingly connected with a reversible power course, not shown. In operation, the machine 34 serves to impart both reversible axial rotation and longitudinal tilting movement to the tank 9 when the latter is placed thereon as shown in Fig. 3. Thus, the machine 34 and the tank 9 form, in effect, a mixing and agitating machine similar in operation to the usual concrete mixer.

After the tank 9 is placed upon the rolls 41, and before the machine 34 is set in motion, the sand component of the aggregate mix, if the same has not been previously introduced within the tank, is fed into the interior of the tank by way of a funnel 44 placed in one of the conduit-receiving openings 26 of the tank. Following introduction of the sand component of the aggregate mix within the tank, a wet cementitious slurry comprising water, Portland cement, and a curing accelerator is introduced within the tank to provide a cementitious aggregate mix comprising approximately by weight:

60 parts sand,
15 parts water,
20 parts Portland cement, and
2 parts accelerator (based on $Na_2SiO_3$).

Figure 4:
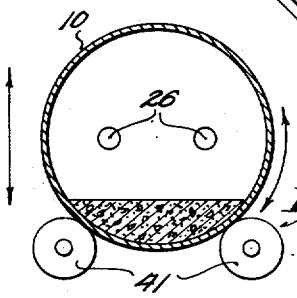
Fig. 4 is a transverse vertical sectional view taken through the tank during the mixing of the components of the aggregate lining material therein.

All of the pipe-receiving openings 26 of the tank are then plugged and the machine 34 is energized to rotate the tank and to tilt the same longitudinally. In this manner, the separate components of the aggregate mix are thoroughly admixed together within the interior of the tank, as shown diagrammatically in Fig. 4 of the drawing. Preferably, the machine 34 is operated to first impart simultaneous rocking and rotation to the tank, with the direction of rotation being reversed after approximately five rotations in either direction, until the separate sand, water, cement, and accelerator components have become thoroughly mixed. Then the machine is conditioned to stop the tilting movement thereof while permitting the tank to rotate about a horizontal axis. This final rotation disperses the mix evenly throughout the length of the tank and prevents an unduly large accumulation of the mix at any one point in the tank.

Figure 5:
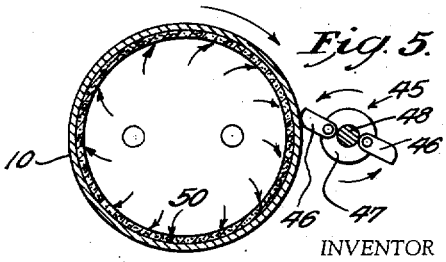
Fig. 5 is a similar view taken through the tank and showing the centrifugal application of the aggregate mix against the interior side walls of the tank; [and]

After mixing of the aggregate, the machine 34 is stopped and the tank 9 containing the aggregate mix is transferred from the mixing machine to a combined spinning and vibrating machine, not shown, which engages and supports the tank at its ends, and imparts relatively high-speed axial rotation to the tank while the latter is maintained in a substantially [horizontally] *horizontal* plane. Fig. 5 of the drawing illustrates diagrammatically this step. In the spinning operation, the relatively fluid aggregate mix within the tank is deposited by centrifugal forces caused by the relatively high-speed rotation (approximately 350 R. P. M.) against the inner wall of the tank body 10. Simultaneously with the spinning of the tank, the latter is subjected to vibrational forces transmitted to the tank by means of a multiplicity of rotary flailing devices 45 which are arranged to strike the outer surface of the tank body along a line extending substantially throughout the length of the tank. Each of the flailing devices 45 comprises a plurality of outwardly projecting striking arms 46 which are pivotally connected at their inner ends to a wheel 47 carried upon a common drive shaft 48. The shaft 48 is arranged adjacent to the outer wall of the tank body and extends in parallel coextensive relation thereto, with each of the flailing devices being carried at relatively closely spaced intervals along the length of the shaft 48. In carrying out the spinning operation, the tank is first rotated for approximately five to eight seconds before subjecting the same to vibration. This permits the aggregation to be forcibly deposited in a uniform layer 50 against the inner wall of the tank body prior to vibrating, at which time the flailing devices are energized to impart relatively high-speed vibrations to the tank which serve to compact and densify the layer 50 of aggregate mix against the inner wall surface. After a predetermined spinning and vibrating cycle (approximately fifteen seconds), the tank is permitted to come to rest. At this time, a pipe-receiving opening 26 in the tank body 10 is opened by removing the spud or plug 31 therefrom, to permit excess water originally contained in and expressed from the mix during the initial spinning and vibrating cycle to drain from the interior of the tank.

After the excess water has been permitted to drain from the interior of the tank, the plug or spud is again placed within the pipe-receiving opening 26 to close the interior of the tank, and a second spinning and vibrating cycle is commenced and continued for another period of approximately fifteen seconds. At the end of the second spinning and vibrating cycle, the aggregate mix has become completely cured due to the removal of the excess water and the action of the [curring] *curing* accelerator incorporated in the mix at the time of introduction within the tank. It is important to note that the second cycle of spinning and vibrating is timed so as to occur simultaneously with the curing and hardening of the aggregate mix, in order that the inner lining 50 of the tank, following the second spinning and vibrating cycle, is completely cured, hardened, and set.

The tank is thereafter removed from the spinning and vibrating machine and the spuds or plugs 31 removed from the various pipe-receiving openings thereof, and with the tank positioned in a vertical or upright position, any remaining excess fluids or water within the tank is permitted to drain through the pipe-receiving openings. The tank, with its inner lining of aggregate, is then in condition for use, as the inner lining material has completely hardened and set in firm direct adherence with the layer of coating material 14 previously applied to the inner wall surfaces of the tank body 10.

The curing accelerator used in the present aggregate mix preferably comprises sodium silicate, or water glass, and functions to greatly speed the setting or curing of the aggregate cementitious mix, and makes possible the complete curing of the layer of inner material during the second and last spinning and vibrating cycle. It is believed that upon removal of the excess fluids or water originally contained within the mix and expressed therefrom during the initial spinning and vibrating cycle, the curing accelerator acts as an adsorption agent for the liquid or moisture which remains within the layer 50 of aggregate after the same is initially applied by centrifugal forces to the inner walls of the tank 10. Thus, the integrally contained moisture within the mix is adsorbed by the curing accelerator which is dispersed evenly through the mix comprising the inner layer 50 of the tank, and tests have shown that the layer of inner lining material 50, immediately following the second and last spinning and vibrating cycle, is completely set and hardened, thus eliminating the necessity for subsequent curing which, in the case of an ordinary cementitious mix, would require in the neighborhood of seventy-two hours, and would additionally permit the inner layer 50 to shrink away from direct contact with the inner wall of the tank. Thus, by effecting a complete cure of the aggregate inner lining during the last vibrating and spinning cycle, when the material comprising the inner lining is being forcibly pressed against the inner wall of the tank, there is no shrinkage whatsoever between the inner lining material and the interior surface of the tank. This results in a substantially integral bond between the inner surface of the tank and the inner liner or layer 50, and tests have shown that the tank containing the inner liner may be dropped from relatively extreme heights without in any way cracking or breaking the inner liner from the interior tank surface.

Figure 6:
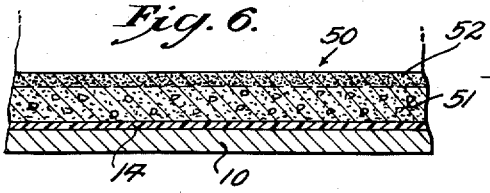
Fig. 6 is an enlarged fragmentary vertical sectional view taken through the tank and its inner lining; *and*
Figure 7:
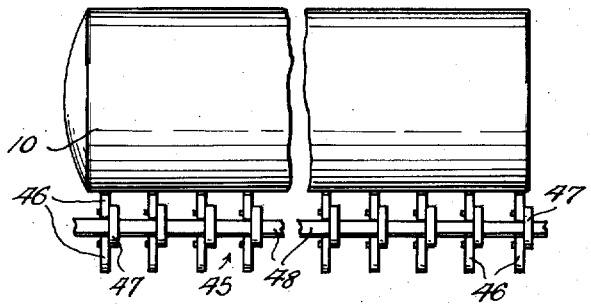
Fig. 7 is a diagrammatic top plan view of a tank and the associated vibration-producing flailing devices.

It is also important to note, with reference to Fig. 6 of the drawing, that the simultaneous high-speed spinning and vibrating operation causes the aggregate inner lining material to assume a definite and distinct strata formation. As shown in cross section in Fig. 6, that portion of the layer 50 which lies adjacent the relatively thin coating layer 14 is made up of the heavier particles of the aggregate mix which are dispersed in relatively widely spaced relation to provide a somewhat porous stratum, while the outer stratum 52 of the layer 50 is made up of relatively finely divided lightweight aggregate materials which provide a denser outer surface layer which comes into contact with the water introduced within the tank. It will be understood, of course, that the particles of the mix comprising the relatively porous stratum 51 are integrally bonded together by the cement constituent, but in view of the relatively large size of the sand particles contained in the stratum 51, as contrasted with the size of the particles contained in the outer stratum 52, the relatively porous stratum provides a good insulating layer between the outer tank wall and the body of liquid contained within the tank, thus aiding in the conservation of heat and greatly decreasing the heat loss occasioned by conduction through the side walls of the tank. The surface of the layer 50 which lies adjacent to the film of coating material 14 is characterized by an extremely hard and dense surface occasioned by contact of the mix with the extremely smooth surface presented by the coating material 14. In viewing samples of the inner lining material which have been broken away from the tank structure for test purposes, it will be noted that the outer surface of the layer 50 possesses an almost glass-like appearance and is substantially fluid-impervious. Another important feature of the lining 50 resides in the relatively fluid-pervious nature of that portion of the layer comprising the strata 51 and 52. While the inner stratum 52 is relatively dense, the same is nonetheless relatively soft and of a calcined nature, while the stratum 51 is relatively hard but of a porous nature, thereby permitting liquid introduced within the tank body to seep through the pores of the strata 51 and 52 to decrease the pressure exerted upon the layer of inner lining material itself and to distribute such pressure throughout the major portion of the inner lining. Yet, at the same time, liquid introduced within the tank is prevented from contacting the inner surface of the metallic tank body 10 by reason of the film 14 of coating material and the substantially fluid-impervious character of the outer surface of the lining layer.

In view of the foregoing, it will be seen that the present invention provides an improved and highly efficient aggregate lined liquid-receiving tank and an efficient and economical method for producing the same. Inner-lined tanks formed in accordance with the present invention are characterized by their high tensile strength and their consequent ability to withstand relatively extreme shock or impact forces without detrimental effect to the inner liner of the tank. Further, by nature of the cementitious aggregate material making up the inner lining of the tank, the same is enabled to withstand the corrosive effect of liquids introduced within the tank by preventing contact between such liquids and the outer metallic shell of the tank.

The invention further provides an efficient and economical method for lining metallic tank bodies and makes possible the mass production of such inner-lined tanks in relatively short periods of time heretofore thought impossible in view of the relatively extreme length of time required in curing cementitious materials. Through the use of the curing accelerator, the aggregate cementitious mix which comprises the inner lining material may be set in a matter of minutes, and, more important, during the actual application and compaction of the mix against the inner side wall of the tank body, thus eliminating the ordinarily long curing time required with ordinary cementitious mixes to transform the same from a plastic state to a completely hardened and cured state.

While certain forms of apparatus have been disclosed in connection with the formation and production of the present inner-lined liquid-receiving tank, it will be understood that various types of machines and apparatus may be employed with equal facility in carrying out the steps of the present method and in producing the end product without departing from the spirit of the invention or the scope of the following claims.

I claim:

1. The method of applying a corrosion-resistant cementitious lining to a metallic tank having a cylindrical body portion and top and bottom closure walls, which comprises coating the entire inner surfaces of said tank with a hardenable phenol-formaledhyde resin; causing said resin to harden; introducing within said tank component parts of a fluid cementitious mix comprising Portland cement, sand, and water; simultaneously axially rotating and tilting said tank about a substantially horizontal axis to thoroughly mix the component parts of said cementitious mix within said tank and to disperse said mix uniformly throughout the length of said tank; and thereafter axially rotating said tank at relatively high speed and simultaneously vibrating the tank to centrifugally apply and compact the mix against the inner surfaces of said tank, the vibration of said tank being effected by forces applied to the exterior thereof along substantially its full length, and continuing rotation of said tank until said mix attains a hardened state.

2. The method of applying a non-frangible, corrosion-resistant inner lining to a cylindrical metallic tank which comprises coating the inner wall surface of the tank with a liquid phenol-formaldehyde resin; curing said resin to a hardenable state; introducing within said tank the components of a fluid cementitious mix comprising Portland cement, sand, and water; simultaneously rotating and tilting said tank to thoroughly admix the components of said mix within the tank; axially rotating said tank at high speed, while maintained in a substantially horizontal plane, and simultaneously vibrating the tank to apply and compact said mix in a continuous layer against the inner wall surface of said tank, said tank being vibrated by forces applied directly to the exterior thereof throughout substantially its full length; and continuing rotation of said tank until the layer of mix attains a hardened state.

3. The method of lining cylindrical metallic bodies which comprises first coating the inner wall surface of a cylindrical metallic body with a film of liquid phenol-formaldehyde resin; causing said resin to harden; introducing within said body the components of a fluid cementitious mix comprising Portland cement, sand, water, and a curing accelerator for said mix; agitating said body in a manner to thoroughly admix said components and accelerator within said body; axially rotating said body about a substantially horizontal axis to centrifugally deposit and compact the mix in a continuous layer upon the inner wall surface of said body; vibrating said body by forces applied externally thereto along a line extending substantially throughout its full length and during rotation thereof; and continuing rotation of said body until said mix cures to a hardened state.

4. In the manufacture of an inner-lined hot water tank, the steps which comprise introducing within an unlined tank the components of a fluid cementitious mix comprising Portland cement, sand, water, and a curing accelerator for said mix; agitating said tank to admix said components and curing accelerator and to disperse the resultant mix uniformly longitudinally of said tank; thereafter axially rotating said tank at high speed about a substantially horizontal axis to centrifugally deposit said mix in a uniform continuous layer against the inner wall surface of said tank; subjecting said tank uniformly throughout the full length thereof to vibration-imparting forces during rotation to compact the layer of mix against the inner wall surface of the tank; and continuing rotation of said tank until said mix attains a hardened state.

5. The method of producing centrifugally formed cementitious linings on the inner surfaces of the cylindrical bodies of water-heating and storage tanks, which comprises: introducing the components of a cementitious plastic mix comprising Portland cement, sand, and water into the interior of such a tank body; mixing said components by agitation of the tank; thereafter spinning the tank by rotating the same rapidly about its longitudinal axis to effect distribution of the mix over the inner surfaces of the tank body and form on such surfaces a hardened permanent lining having walls of substantially uniform thickness, and during said spinning of the tank applying rapidly executed flailing forces to the exterior of the tank body along a line extending substantially the full length thereof, whereby to impart uniform vibration to all portions of said body during centrifuging of the lining-forming materials within the tank.

6. The method of lining water-heating and storing tanks composed of hollow cylindrical bodies having the ends thereof provided with attached closure heads, [the steps which comprise] *which comprises:* introducing into the interior of a head-closed body of such a tank the components of a plastic Portland cement, sand, and water mix; then rotating said body first in one direction and then in the other about its longitudinal axis and tilting the same back and forth about a transverse axis disposed intermediately of the tank to thoroughly agitate the mix; thereafter spinning the tank about its longitudinal axis [as] *at* a relatively high rate of speed; applying to said body during such spinning thereof rapidly executed vibratory forces along a line extending substantially the full length of said body; discontinuing said spinning and opening the tank body to drain free water thereform; and thereafter again spinning the tank about its longitudinal axis to fully compact the said mix against the inner walls of the tank.

7. The method of applying a corrosion-resisting lining to the inner surfaces of the cylindrical bodies of water-heating and storage tanks, which comprises: introducing the components of a cementitious plastic mix containing Portland cement, sand, water, and a curing accelerator into the interior of such a tank body; mixing said components by rotating said tank body about its longitudinal axis while rocking the same back and forth about an axis disposed transversely and intermediately of the tank; then discontinuing the oscillation of the tank body about said transverse axis and subjecting the same to a second stage of rotation in which the body is caused to spin about its longitudinal axis at a higher rotational speed than that accorded to said body during mixing stage rotation thereof; during said second stage high speed rotation of the tank body applying to the exterior thereof rapidly executed flailing forces along a line extending substantially the full length of the tank body to cause all parts thereof to vibrate uniformly; discontinuing the flailing and high speed rotation of the body and removing free water from the interior thereof; and again subjecting said body following water removal to high speed spinning to produce with the presence of said accelerator a hardened and cured composite cementitious lining on the inner surfaces of said body, the combined spinning and flailing operations causing the composition of said mix and the lining formed therefrom to possess a smooth, hard, dense surface formation in outer regions thereof disposed immediately adjacent said tank body and which is backed by a relatively coarse, rough and porous body formation.

*8. The method of producing centrifugally formed cementitious linings on the inner surfaces of the cylindrical bodies of water-heating and storing tanks, which comprises: introduducing Portland cement, sand, and water into the interior of a cylindrical tank body; and thereafter spinning said tank body by rotating the same rapidly about its longitudinal axis to effect substantially uniform distribution of the materials introduced therein over the inner surfaces of the tank body, and simultaneously with said spinning of the tank body applying rapidly executed flailing forces to the exterior of the tank body along a line extending substantially the full length thereof, whereby to impart vibration to substantially all portions of said tank body during the centrifugal application of the materials introduced into said tank to the interior surfaces thereof.*

References Cited in the file of this patent or the original patent

UNITED STATES PATENTS

| | | |
|---|---|---|
| 155,473 | Stephens | Sept. 29, 1874 |
| 1,676,815 | Beatty | July 10, 1928 |
| 1,873,945 | Kraenzlein et al. | Aug. 23, 1932 |
| 1,932,726 | Eoloff et al. | Oct. 31, 1933 |
| 2,148,558 | Huebner | Feb. 28, 1939 |
| 2,235,937 | Linberg | Mar. 25, 1941 |
| 2,395,731 | Ford | Feb. 26, 1946 |
| 2,450,095 | Seebold | Sept. 28, 1948 |

FOREIGN PATENTS

| | | |
|---|---|---|
| 277,095 | Italy | Aug. 29, 1930 |
| 459,680 | Great Britain | Jan. 13, 1937 |